UNITED STATES PATENT OFFICE.

RONALD VAN AUKEN MILLS, OF SANDY SPRING, MARYLAND.

PROCESS OF EXCLUDING WATER FROM OIL AND GAS WELLS.

1,421,706.  Specification of Letters Patent.  Patented July 4, 1922.

No Drawing.  Application filed October 15, 1918. Serial No. 258,260.

(FILED UNDER THE ACT OF MARCH 3, 1883, 22 STAT. L., 625.)

*To all whom it may concern:*

Be it known that I, RONALD VAN AUKEN MILLS, a citizen of the United States, residing at Sandy Spring, Montgomery County, Maryland, have invented certain new and useful Improvements in Processes of Excluding Water from Oil and Gas Wells, of which the following is a specification.

It is a matter of common knowledge that many oil and gas wells or even entire oil and gas fields suffer progressive decrease in yield and are finally abandoned (though the oil and gas recoverable by proper methods are by no means exhausted) because of the detrimental effects of waters, brines or other aqueous solutions infiltrating into wells or encroaching upon the productive portions of oil and gas bearing rocks from surrounding portions of the same or a nearby stratum.

It is also commonly known that metal casings used in oil and gas wells to prevent caving and to exclude water from oil and gas sands are attacked by oil and gas field waters causing serious corrosion and leakage, and spoiling the casing for further use. Interior tubings and other deep well equipment are similarly injured.

It is also well known that in certain fields the oil and gas bearing strata are loose unconsolidated sands which cave during drilling operations, and pass into wells and well tubings, causing trouble in drilling and injury to well equipment, and necessitate the unprofitable handling of large quantities of sand.

My invention relates to the correction and prevention of these evils and consists primarily of a new and improved process for cementing and plugging wells, lithifying unconsolidated sands, or other rock forming materials, filling and sealing the interstices of porous sands or rocks more particularly those of water, oil or gas bearing strata, for the exclusion of injurious waters or solutions from wells and from contact with metal well casings, tubings or pipes. My invention furthermore relates to the changing of the chemical qualities of such injurious solutions as do leak into wells or other rock cavities so that the corrosive action of said solutions upon metallic casings, tubings and pipes shall be diminished or prevented.

In brief this new process consists in introducing into wells, porous sands, or other porous rocks or rock-forming materials, one or more soluble chemical reagents, either as solids, liquids, gases or muds, dry or in aqueous or other solutions, free or in containers; and under any necessary pressure that is practical, so that the said reagent or reagents come in contact with and react chemically with each other, with the wall rock materials of the wells, or with the dissolved constituents of natural waters or other solutions in the wells and interstices of porous rocks in such manner as to cause chemical and physical precipitation in the wells and rock interstices. By this means it is possible and practicable to consolidate loose sands, to render certain portions of a porous stratum practically or relatively impermeable to water, oil or gas, to exclude injurious waters, brines or other solutions from contact with metal casings and tubings, and to effectively plug and cement off water from deep wells. The process further consists of introducing and retaining in a well or other rock cavity an excess of said reagent or reagents in such manner as to react chemically with and diminish or prevent the corrosive action of waters, brines or other solutions upon metallic well casings, tubings, or pipes.

This new process has several advantages over the common use of Portland cement, hydraulic lime, or ordinary clay, shale or rock mud for these purposes, in that the liquid reagents and solutions used in my process more readily penetrate and permeate the porous rock before precipitation with the resultant sealing of the rock interstices takes place. Furthermore, while the setting of Portland cement and the retention of its firm impermeable character after setting are interfered with or destroyed by certain types of oil and gas field waters, brines or other aqueous solutions, in my process the reagents introduced into the wells are selected with special reference to the qualities of the solutions to be sealed off, so that in general these solutions will assist rather than retard cementation. Furthermore, where so desired, the qualities of a water, brine or other solution in a well or stratum can be changed to suit and assist my process by introducing the proper kinds and amounts of one or more chemical reagents into the well or wells being treated.

My process is also preferable to those involving the use of Portland cement and hydraulic lime, in that where desired, the cements formed and applied in my process are practically insoluble in most acids, and permit the acid treatment of wells without injury to the cements, which would be impossible with cements and limes now commonly used.

While having certain advantages over the mud-laden fluid process already mentioned, my process can be used in conjunction with the mud-laden fluid process and thereby constitutes a distinct improvement over that process. Ordinary clay shale, or rock mud can be suspended in a specially prepared chemical solution whose dissolved constituents will be precipitated in the wells and interstices of the rocks under treatment, thereby assisting the mud in its displacement and exclusion of fluids. Furthermore, a chemical reagent (such, for example, as calcium sulphate, calcium carbonate, or magnesium carbonate) may be used as a mud-forming constituent and will gradually enter solution and react slowly with the other reagents (such, for instance, as sodium silicate) introduced into the wells and rocks, to form chemical precipitates, such, for instance, as calcium or magnesium silicates.

Regulation of the rapidity of reaction and precipitation and of the qualities of the precipitates, to suit specific conditions being treated, through varying the kind and relative proportions of reagents and solutions, and the temperatures and pressures at which they are used, is an important part of my process.

The precipitates formed and applied in this process may be hard or soft, crystalline, flocculent, gelatinous, or colloidal, and finely divided or coarse, dependent upon physico-chemical conditions, the reagents used, and the conditions under treatment.

In plugging or cementing a well or other cavity, loose sand or other fine or coarse rock forming material may be introduced into such cavity together with chemical reagents.

To illustrate more fully my invention a few simple examples are presented to show some of the reagents that are introduced into wells and porous rocks and the cementing precipitates that are formed:

(1) {Commercial sodium silicate or water glass in aqueous solution} + {Aqueous solution of calcium chloride which is a natural constituent of many oil and gas field brines} yields {Calcium silicate precipitate} + {Aqueous solution of sodium chloride}

(2) {Commercial sodium silicate or water glass in aqueous solution} + {Aqueous solution of magnesium chloride which is a natural constituent of many oil and gas field brines} yields {Magnesium silicate precipitate} + {Aqueous solution of sodium chloride}

(3) {Commercial sodium silicate or water glass in aqueous solution} + {Commercial hydrochloric acid} yields Silica precipitate + {Aqueous solution of sodium chloride}

(4) {Aqueous solution of sodium carbonate or sodium bicarbonate} + {Aqueous solution of calcium chloride, introduced or as a natural constituent of oil and gas field brine or both} yields {Calcium carbonate precipitate} + {Aqueous solution of sodium chloride}

(5) {Aqueous solution of sodium sulphate} + {Aqueous solution of barium chloride introduced or as a natural constituent of oil and gas field brines or both} yields {Barium sulphate precipitate} + {Aqueous solution of sodium chloride}

(6) {Calcium sulphate in finely divided particles in suspension in water or mud and sparingly in solution in water} + {Aqueous solution of commercial sodium silicate or water glass} yields {Calcium silicate precipitate} + {Calcium sulphate residue} + {Aqueous solution of sodium sulphate}

(7) {Finely divided particles of calcium oxide in suspension in water or mud and calcium hydroxide in solution in water} + {Aqueous solution of commercial sodium silicate} yields {Calcium silicate precipitate} + {Aqueous solution of water soluble sodium and calcium compounds}

There are a great many other commercial reagents which can be thus mixed to yield precipitates to cement and plug wells and interstices in porous rocks. My process is therefore by no means confined to the use of those reagents named herein.

I claim as my invention:

1. A process of the character described which consists in introducing into a well or other rock cavity rock forming material and reagents adapted to react chemically with the dissolved constituents of natural rock solutions to form a precipitate adapted to render said rock forming material substantially impervious.

2. A process of the character described which consists in introducing into a well or other rock cavity rock forming materials adapted to react chemically with the dissolved constituents of the natural rock solutions to form a precipitate adapted to render said rock forming materials substantially impervious.

3. A process of the character described which consists in introducing into a well or other rock cavity a reagent adapted to react chemically with the natural rock solutions to diminish their corrosive character, and thereby to protect well casings and tubings against corrosion.

4. The process of claim 3 in which the reagent is in excess whereby its action will be continued upon further leakage of natural rock solutions into the well cavity.

5. A process of the character described which consists in introducing into a well or other rock cavity a reagent adapted to react chemically with the natural rock solutions to diminish their disintegrating action upon Portland cement and hydraulic lime, and thereby to protect such cements against the disintegrating action of natural rock solutions.

6. The process of claim 5 in which the reagent is in excess whereby its action will be continued upon further leakage of natural rock solutions into the well cavity.

RONALD VAN AUKEN MILLS.